United States Patent [19]

Inatani et al.

[11] Patent Number: 5,661,198

[45] Date of Patent: Aug. 26, 1997

[54] ABLATOR COMPOSITIONS

[75] Inventors: Yoshifumi Inatani, No. 1748-15, Hanbara, Aikawa-cho, Akio-gun, Kanagawa Prefecture; Kazunori Kawasaki, Kawagoe City; Tadashi Harada, Omiya; Hironao Fujiki, Iwahana-machi; Mikio Shiono, Annaka, all of Japan

[73] Assignees: Nissan Motor Co., Ltd., Yokohama; Yoshifumi Inatani, Kanagawa Prefecture; Shin-Etsu Chemical Co., Ltd., Tokyo, all of Japan

[21] Appl. No.: 312,734

[22] Filed: Sep. 27, 1994

[30] Foreign Application Priority Data

Sep. 27, 1993 [JP] Japan .................. 5-240132

[51] Int. Cl.$^6$ ............ C09K 21/14; C08L 83/04; C08G 77/06
[52] U.S. Cl. .......... 523/179; 524/862; 525/478; 528/15; 528/31; 528/32
[58] Field of Search .................. 523/179; 524/862; 525/478; 528/15, 31, 32

[56] References Cited

U.S. PATENT DOCUMENTS

| | | | |
|---|---|---|---|
| 3,699,073 | 10/1972 | Wada et al. | 360/375 B |
| 3,711,520 | 1/1973 | Pfeifer et al. | 260/375 B |
| 3,723,481 | 3/1973 | Bobear | 260/375 B |
| 4,031,059 | 6/1977 | Strauss | 260/375 B |
| 4,581,391 | 4/1986 | Baldwin et al. | 523/179 |
| 4,871,795 | 10/1989 | Pawar | 523/179 |

FOREIGN PATENT DOCUMENTS 58-161985  9/1983  Japan .

OTHER PUBLICATIONS

"Revised Handbook of Aeronautics and Astronautics", Apr. 25, 1983, p. 242.

*Primary Examiner*—Karen A. Dean
*Attorney, Agent, or Firm*—Lowe, Price, LeBlanc & Becker

[57] ABSTRACT

The invention relates to an ablator composition for providing ablation protection. The ablator composition comprises 100 parts by weight of a mixture of vinyl-containing organopolysiloxanes, the mixture containing 50–80 wt. % of a diorganopolysiloxane which contains vinyl groups and 20–50 wt. % of a silicone resin which contains vinyl groups; an organohydrogenpolysiloxane containing in one molecule thereof at least three hydrogen atoms which are directly bonded to silicon atoms thereof; a catalyst which is at least one selected from the group consisting of metallic platinum and platinum compounds; up to 150 parts by weight of silica microballoons; and at least one selected from the group consisting of up to 15 parts by weight of quartz glass fibers and up to 15 parts by weight of carbon fibers. An ablator material prepared by curing the ablator composition has a low surface recession rate even under a condition of a high heating rate such as about 4 MW/m$^2$ and a high pressure such as about one atmospheric pressure.

12 Claims, 1 Drawing Sheet

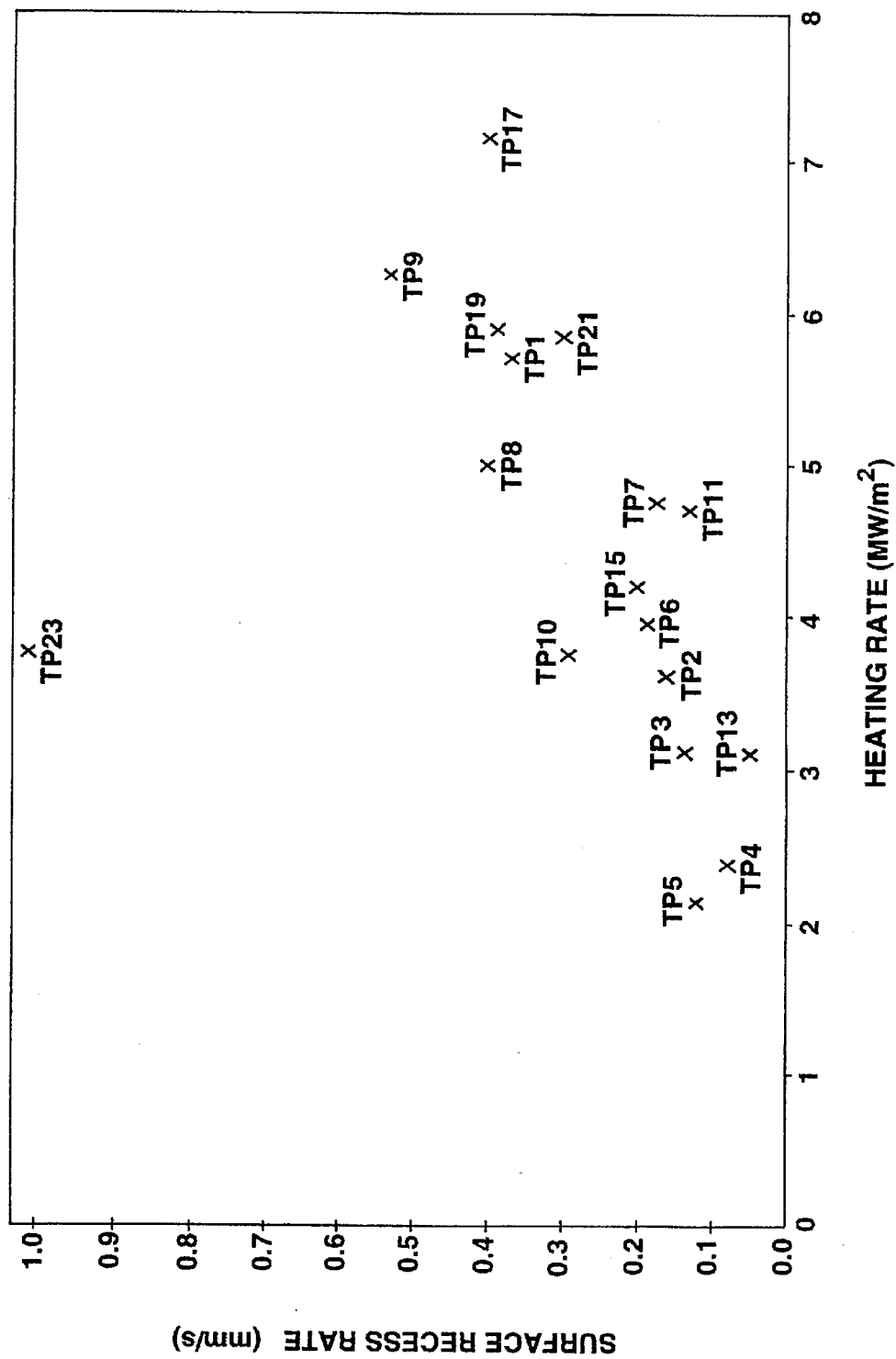
FIGURE

ABLATOR COMPOSITIONS

BACKGROUND OF THE INVENTION

The present invention relates to ablator compositions for protecting the underlying structure of a spacecraft or the like from the aerodynamic heating caused by travel at high speed during reentry through the atmosphere. An ablating material which is to be applied to the exterior of the underlying structure is prepared by curing the ablator composition.

As thermal protection materials for the underlying structure of a spacecraft or the like, for example, carbon/carbon-fiber composite materials, high melting point oxides, nitrides and carbides are known.

It is mentioned in Revised Handbook of Aeronautics and Astronautics (written in Japanese, published on Apr. 25, 1983, p. 242) that ablation cooling by latent heat through volatilization (sublimation) of a solid into a gas may be also taken as one of the thermal protections.

JP-A-58-161985 discloses a low density ablator composition comprising a mixture of a silicone resin and silica microballoons wherein the silica microballoons contain at least 85.0 wt. % of $SiO_2$ and the weight ratio of the silica microballoons to the silicone resin is in a range of from 50:50 to 70:30.

U.S. Pat. No. 4,031,059 discloses a low density ablator composition which has a density of not greater than 0.25 g/cc and comprises a polysiloxane, a low density filler, hollow silica or glass microspheres, and silica fibers.

Conventional ablating materials such as those of the above patent publications are satisfactory in thermal protection under a condition of a low heating rate ranging from about 0.5 to about 1.0 $MW/m^2$ and a low pressure of about 0.1 atmospheric pressure.

Recently, a demand for ablating materials which are satisfactory in thermal protection even under a condition of a high heating rate such as about 4 $MW/m^2$ and a high pressure such as about one atmospheric pressure has been increased. Furthermore, a demand for ablating materials which can prevent damage caused by thermal shock and are superior in brittleness at a low temperature has been increased.

SUMMARY OF THE INVENTION

It is therefore an object of the present invention to provide an improved ablator composition for providing a more satisfactory thermal protection even under a condition of a high heating rate such as about 4 $MW/m^2$ and a high pressure such as about one atmospheric pressure, as compared with conventional ablator compositions.

It is a more specific object of the present invention to provide an improved ablator composition for maintaining a low surface recession rate of an ablating material even under the above condition. The surface recession rate is defined as the decrease in the thickness of the ablating material per unit time.

It is another object of the present invention to provide an ablating material which is superior in thermal shock resistance.

It is still another object of the present invention to provide an ablating material which is superior in brittleness at a low temperature.

It is a further object of the present invention to provide an ablating material which is light in weight.

According to a first aspect of the present invention, there is provided an ablator composition for providing ablation protection, comprising:

100 parts by weight of a mixture of vinyl-containing organopolysiloxanes, said mixture containing 50–80 wt. % of a diorganopolysiloxane which contains vinyl groups and 20–50 wt. % of a silicone resin which contains vinyl groups, the silicone resin being soluble in toluene and consisting essentially of $R_3SiO_{1/2}$ unit and $SiO_2$ unit wherein R represents the same or different monovalent hydrocarbon groups each of which is unsubstituted or substituted and has 1 to 10 carbon atoms, the molar ratio of $R_3SiO_{1/2}$ unit to $SiO_2$ unit being in a range of from 0.6 to 1.4;

an organohydrogenpolysiloxane containing in one molecule thereof at least three hydrogen atoms which are directly bonded to silicon atoms thereof, the amount of said hydrogenpolysiloxane being such that the molar ratio of the total of said hydrogen atoms to the total of said vinyl groups contained in said diorganopolysiloxane and said silicone resin is in the range of from 0.5 to 5.0;

a catalyst which is at least one selected from the group consisting of metallic platinum and platinum compounds, the amount of said catalyst being sufficient to cure the ablator composition;

up to 150 parts by weight of silica microballoons; and at least one selected from the group consisting of up to 15 parts by weight of quartz glass fibers and up to 15 parts by weight of carbon fibers.

According to a second aspect of the present invention, there is provided an ablating material which is prepared by curing an ablator composition according to the first aspect of the present invention.

BRIEF DESCRIPTION OF THE DRAWINGS

FIGURE is a graph illustrating the heating rates and the surface recess rates of the ablating materials according to Examples 1–7 of the present invention and Comparative Example.

DESCRIPTION OF THE PREFERRED EMBODIMENTS

An improved ablator composition according to the present invention for providing ablation protection will be described in the following. An ablating material which is to be applied to the exterior of the underlying structure of a spacecraft or the like is prepared by curing the ablator composition. As follows, the ablator composition contains first to sixth components as essential components.

The ablator composition contains 100 parts by weight of a mixture of vinyl-containing organopolysiloxanes (the first and second components). This mixture contains, as the first component, 50–80 wt. % of a diorganopolysiloxane which contains vinyl groups bonded to silicon atoms in the molecule and, as the second component, 20–50 wt. % of a silicone resin which contains vinyl groups bonded to silicon atoms in the resin.

The diorganopolysiloxane of the first component serves as a main component of the composition and constitutes a matrix of the composition together with some other components. If the amount is less than 50 wt. % based on the total weight of the mixture of vinyl-containing organopolysiloxanes, it makes the matrix difficult to hold other components with a sufficient physical strength. If the amount is greater than 80 wt. %, the ablating material becomes inferior in ablation protection.

The diorganopolysiloxane is preferably represented by, for example, the following general formula [I].

$(CH_2=CH)R^1{}_2SiO[R^1{}_2SiO]_nSiR^1{}_2(CH=CH_2)$  [I]

wherein $R^1$ represents the same or different monovalent hydrocarbon groups each of which is unsubstituted or substituted and has 1 to 10 (preferably 1 to 8) carbon atoms, and n is an integer ranging from 50 to 600 and preferably from 100 to 500.

Examples of $R^1$ are alkyl groups such as methyl group, ethyl group, propyl group, isopropyl group, butyl group, isobutyl group, ter-butyl group, pentyl group, neopentyl group, hexyl group, cyclohexyl group, octyl group, nonyl group and decyl group; alkenyl groups such as vinyl group, allyl group, propenyl group, isopropenyl group, butenyl group, isobutenyl group, hexenyl group and cyclohexenyl group; aryl groups such as phenyl group, tolyl group, xylyl group and naphthyl group; aralkyl groups such as benzyl group, phenylethyl group and phenylpropyl group; and substituents of the above groups, wherein halogen atoms such as fluorine, chlorine and bromine, cyano group and the like are partially or entirely substituted for hydrogen atoms of the above groups, such as chloromethyl group, chloropropyl group, bromoethyl group, trifluoropropyl group, chlorophenyl group and dichlorophenyl group. Preferable examples of $R^1$ are vinyl group, methyl group and phenyl group from the view points of availability, flexibility at a certain low temperature, strength of the ablating material and the like. For the purpose of maintaining flexibility at a certain low temperature, it is preferable that monovalent hydrocarbon groups represented by $R^1$ contain 1–20 (more preferably 5–10) mol % of phenyl group and 80–99 (more preferably 90–95) mol % of methyl group. If the amount of phenyl group is out the preferable range, the ablating material may fracture by the heat cycle in space. If necessary, for the purpose of increasing the crosslinking density, monovalent hydrocarbon groups represented by $R^1$ may contain up to about 2 mol % of vinyl group.

In the above general formula [I], if "n" is less than 50, the ablating material may become brittle and thus inferior in mechanical strength. If "n" is greater than 600, the mixing work of the components of the ablator composition may become difficult. With this, the uniformly mixed ablator composition may not be obtained.

Viscosity of the diorganopolysiloxane at 25° C. ranges from about 50 to about 50,000 cP and preferably from about 100 to about 20,000 cP.

Advantages of the addition of the silicone resin of the second component are to increase the physical strength of the ablating material by cure of the silicone resin and to substantially decrease the weight reduction rate of the ablating material after the burning of the ablating material. This weight reduction rate is defined as the decrease in the ablating material's weight after the burning of the same as if the ablating material's weight before the burning is 100. When the weight reduction rate of the ablating material is small, the carbonized layer of the ablating material becomes thin in thickness. With this, the total thickness of the ablating material which is to be applied to a spacecraft or the like can be reduced, thereby reducing the ablating material's weight and the total weight of a spacecraft or the like.

In fact, when the ablating material is subjected to an aerodynamic heating of a certain degree, the surface layer of the ablating material is burned and thus turned into the carbonized layer. In contrast, the underlying layer of the ablating material remains as the virgin layer, viz. the noncarbonized or unburned original layer.

If the amount of the silicone resin is less than 20 wt. % based on the total weight of the mixture of vinyl-containing organopolysiloxanes, the degree of the above advantages of the silicone resin addition becomes too low. If the amount of the same is more than 50 wt. %, the degree of the above advantages does not increase any more and it becomes difficult to get uniform mixing of the components of the ablator composition due to the increase of viscosity.

The silicone resin of the second component is soluble in toluene and consists essentially of $R_3SiO_{1/2}$ unit and $SiO_2$ unit wherein R represents the same or different monovalent hydrocarbon groups each of which is unsubstituted or substituted and has 1 to 10 (preferably 1 to 8) carbon atoms. The above-mentioned examples of $R^1$ of the general formula [I] can be cited as examples of R. In fact, in view of compatibility with the diorganopolysiloxane, preferable examples of R are vinyl group, methyl group and phenyl group. It is preferable that the remaining groups of R, except vinyl group, contain 80–100 mol % of methyl group and 0–20 mol % of phenyl group.

The molar ratio of $R_3SiO_{1/2}$ unit to $SiO_2$ unit is in a range of from 0.6 to 1.4. If the ratio is less than 0.6, third-dimensional crosslinking or partial gelation of the silicone resin itself occurs partially. With this, the silicone resin becomes insoluble in toluene. If the ratio is greater than 1.4, the silicone resin does not have a suitable structure as a resin. With this, the degree of the above advantages of the silicone resin addition becomes too low. The vinyl group equivalent of the silicone resin is in a range of from 0.05 to 0.15 mol/100 g resin.

The ablator composition further contains, as the third component, an organohydrogenpolysiloxane containing in one molecule thereof at least three hydrogen atoms which are directly bonded to silicon atoms thereof, viz. at least three SiH groups. The organohydrogenpolysiloxane serves as a crosslinking agent for curing the ablator composition. If the above number is less than three, crosslinking of the ablator composition does not proceed sufficiently.

The organohydrogenpolysiloxane preferably has the following unit [II]:

$$R^2{}_aH_bSiO_{(4-a-b)/2}$$  [II]

wherein $R^2$ represents the same or different monovalent hydrocarbon groups each of which is unsubstituted or substituted and has 1 to 10 (preferably 1 to 8) carbon atoms, "a" is 0, 1 or 2, and "b" is 1 or 2, with a proviso that "(a+b)" is 1, 2 or 3. The above-mentioned examples of $R^1$ of the general formula [I] can be cited as examples of $R^2$. Furthermore, of the above-mentioned examples of $R^1$, monovalent hydrocarbon groups except aliphatic unsaturated hydrocarbon groups can be preferably cited as examples of $R^2$. Methyl group and phenyl group are more preferable examples of $R^2$ from the view points of compatibility with the diorganopolysiloxane and the silicone resin, property of the ablating material and the like. Substituents bonded to silicon atoms of other siloxane units of the organohydrogenpolysiloxane, except the above-mentioned at least three hydrogen atoms, are unsubstituted or substituted monovalent hydrocarbon groups which are the same as those represented by $R^2$. In fact, it is more preferable that the total monovalent hydrocarbon groups represented by $R^2$ in the molecule contain 80–100 mol % of methyl group and 0–20 mol % of phenyl group.

The molecular structure of the organohydrogenpolysiloxane is not particularly limited. It may be a straight chain, cyclic, branched chain or network structure. Furthermore, silicon atom to which hydrogen atom is bonded, viz. SiH group of the organohydrogenpolysiloxane, may be positioned either at the terminal of the molecule chain or midway between the terminals of the molecule chain.

For the purpose of improving, in particular, mechanical characteristics of the ablating material, the organohydrogenpolysiloxane is preferably one of the following first, second and third examples. The first example is represented by the following general formula [III]:

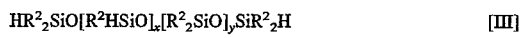

$HR^2{}_2SiO[R^2HSiO]_x[R^2{}_2SiO]_ySiR^2{}_2H$      [III]

wherein "x" is an integer ranging from 1 to 100 and "y" is an integer ranging from 0 to 100 with a proviso that (x+y) is in the range of from 1 to 200, preferably from 1 to 100, and wherein the amount of hydrogen atom bonded to silicon atom, viz. SiH group, contained in the molecule is in the range of from 0.3 to 1.6 mol/g.

The second example is represented by the following general formula [IV]:

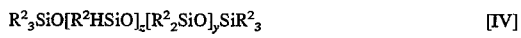

$R^2{}_3SiO[R^2HSiO]_z[R^2{}_2SiO]_ySiR^2{}_3$      [IV]

wherein "z" is an integer ranging from 3 to 100 and "y" is an integer ranging from 0 to 100 with a proviso that (z+y) is in the range of from 3 to 200, preferably from 3 to 100, and wherein the amount of hydrogen atom bonded to silicon atom, viz. SiH group, contained in the molecule is in the range of from 0.3 to 1.6 mol/g.

The third example consists of $R^2{}_2HSiO_{1/2}$ unit and $SiO_2$ unit wherein the molar ratio of $R^2{}_2HSiO_{1/2}$ unit to $SiO_2$ unit is in the range of from 0.6 to 2.0 and wherein the amount of hydrogen atom bonded to silicon atom, viz. SiH group, contained in the molecule is in the range of from 0.3 to 1.6 mol/g.

The amount of the organohydrogenpolysiloxane is such that the molar ratio of the total of the hydrogen atoms to the total of the vinyl groups which are contained in the composition or, in general, in the total of the diorganopolysiloxane of the first component and the silicone resin of the second component is in a range of from 0.5 to 5.0. If the ratio is less than 0.5, crosslinking density becomes too low. With this, the ablating material becomes inferior in strength. If the ratio is more than 5.0, foaming tends to occur during the cure so that the property of the ablating material becomes inferior and the ablating material becomes brittle.

The ablator composition further contains, as the fourth component, a catalyst for cure of the same. In fact, it catalyzes an addition reaction between the vinyl groups of the diorganopolysiloxane and the silicone resin and the hydrogen atoms of the hydrogen polysiloxane. This catalyst is at least one selected from the group consisting of metallic platinum and platinum compounds. In fact, examples of the catalyst are metallic platinum including platinum black, a substance prepared by adsorbing metallic platinum on a carrier such as alumina or silica, and platinum compounds such as chloroplatinic acid, and a complex of chloroplatinic acid and a aliphatic unsaturated hydrocarbon, an alcohol, vinyl siloxane or the like. A certain amount of the catalyst is added so as to be sufficient to cure the ablator composition. In fact, it suffices that 1–2000 ppm by weight, based on the total weight of the diorganopolysiloxane and the silicone resin, of platinum atom contained in the catalyst is added. It is more preferable that the amount is in a range of from 10 to 200ppm. If the amount is too small, the cure becomes inferior or the curing time becomes too long. If the amount is too large, it makes difficult to take a sufficient working time because of the curing time being too short. Furthermore, it becomes uneconomical, too.

The ablator composition further contains, as the fifth component, up to 150 parts by weight of silica microballoons to 100 parts by weight of the mixture of the first and second components for reducing the ablating material in weight and for improving the ablating material in heat insulation characteristic. The silica microballoons are used as a filler and defined as hollow microspheres containing $SiO_2$ as a main component thereof. Gas contained in the silica microballoons is air which is the same as the atmosphere. The particle size of the silica microballoons is in the range of from 10 to 200 μm, preferably from 30 to 100 μm. Their true specific gravity is preferably in the range of from 0.20 to 0.40. Material to prepare the silica microballoons is, for example, natural quartz or synthetic quartz. Specific gravity of such quartz glass is preferably in the range of from 2.2 to 2.3. If the amount of silica microballoons is more than 150 parts by weight, the surface recess rate increases significantly and it becomes difficult to uniformly mix the components of the ablator composition. To further improve heat insulation characteristic of the ablating material, the amount of silica microballoons is preferably at least 15 parts by weight. Thus, a preferable range of the amount of silica microballoons is from 15 to 150 parts by weight.

The ablator composition further contains, as the sixth component, up to 15 parts by weight of quartz glass fibers and/or up to 15 parts by weight of carbon fibers to 100 parts by weight of the mixture of the first and second components for improving shear strength of the ablating material and for preventing separation of the carbonized layer from the virgin layer of the ablating material.

If the amount of quartz glass fibers is more than 15 parts by weight, it becomes difficult to uniformly mix the components of the ablator composition due to aggregation of the quartz glass fibers. To further improve strength of the carbonized layer and thus further lower the surface recess rate of the ablating material, the amount of quartz glass fibers is preferably at least 5 parts by weight when the quartz fibers are selected. Thus, a preferable range of the amount of quartz glass fibers is from 5 to 15 parts by weight. The quartz glass fibers are prepared, for example, by mechanically drawing fused natural or synthetic quartz from a nozzle and, and the same time, by rapidly cooling the same. The quartz glass fiber is preferably from 4 to 20 μm in diameter and preferably from 0.5 to 20 mm in axial length.

If the amount of carbon fibers is more than 15 parts by weight, heat conductivity of the ablating material increases. With this, the ablating material becomes somewhat inferior in heat insulation characteristic. To achieve the above-mentioned purposes of the addition of the sixth component, the amount of carbon fibers is preferably at least 3 parts by weight when the carbon fibers are selected. Thus, a preferable range of the amount of carbon fibers is from 3 to 15 parts by weight. The carbon fibers are prepared, for example, by burning PAN-based fibers. The carbon fiber is preferably from 5 to 10 mm in diameter and preferably from 0.5 to 20 μm in axial length.

The quartz glass fibers have a relatively lower heat conductivity as compared with the carbon fibers. Therefore, the quartz fibers can be widely used and thus are preferable to the carbon fibers as the sixth component.

In addition to the above-mentioned first to sixth components, for the purpose of adjusting curing time or the like of the ablator composition, the composition may contain a known reaction controlling agent such as a vinyl-containing organopolysiloxanes such as vinylcyclotetrasiloxane, triallylisocyanurate, acetylene alcohols and their derivatives such as ethylylcyclohexanol, silane- or siloxane-modified acetylene alcohols, hydroperoxide, and benzotriazole. One of these examples or a mixture of at least two of these examples may be added to the ablator composition.

It is preferable that the ablating material has a density of at least 0.35 g/cc. If it is less than 0.35 g/cc, the amount of surface recess of the ablating material tends to increase. It is more preferable that the ablating material has a density ranging from 0.35 to 0.80 g/cc. If it is more than 0.80 g/cc, the ablating material tends to become somewhat inferior in heat insulation characteristic.

According to the present invention, the carbonized layer of the ablating material after the burning thereof is substantially improved in brittleness. Therefore, even when the carbonized layer is continuously subjected to a severe aerodynamic heating under a condition of a high heating rate such as about 4 MW/m$^2$ and a high pressure such as about one atmospheric pressure, the separation of the carbonized layer from the virgin layer of the ablating material is substantially suppressed. Thus, the surface recess rate of the ablating material becomes substantially low. In other words, the original shape of the carbonized layer tends to be maintained. With this, the temperature increase of the virgin layer is substantially suppressed. Thus, according to the present invention, an ablating material can be made relatively thin in thickness, as compared with conventional ablating materials. This contributes to the total weight reduction of a spacecraft of the like.

The present invention will be illustrated with the following nonlimitative examples.

EXAMPLE 1

An ablator composition was prepared by mixing a phenylmethylpolysiloxane (diorganopolysiloxane) as the first component, a silicone resin as the second component, a methylhydrogenpolysiloxane as the third component, a platinum-vinylsiloxane complex solution (catalyst), as the fourth component, containing 2 wt. % of platinum atoms, silica microballoons as the fifth component, and quartz glass fibers and carbon fibers as the sixth component. The mixing proportion of the components of the ablator composition is shown in Table 1. In Table 1, the amounts of the components of the ablator composition are expressed by parts by weight, except the amount of catalyst. In fact, the amount of catalyst is expressed by ppm by weight of the platinum atom therein based on the total weight of the phenylmethylpolysiloxane and the silicone resin.

In the above phenylmethylpolysiloxane, both end groups were terminated with vinyldimethylsilyl groups. The phenylmethylpolysiloxane contained 5.5 mol %, based on the total number of moles of diorganosiloxane unit of the main chain thereof, of diphenylsiloxane unit. Its remaining unit was dimethylsiloxane unit. The phenylmethylpolysiloxane was 5,000 cP in viscosity at 25° C. and about 450 in degree of polymerization.

The above silicone resin was soluble in toluene, contained vinyl groups, and consisted of $(CH_3)_3SiO_{1/2}$ unit, $(CH_2=CH)(CH_3)_2SiO_{1/2}$ unit and $SiO_2$ unit. Its vinyl group equivalent was 0.08 mol/100 g resin. The molar ratio of the total of $(CH_3)_3SiO_{1/2}$ unit and $(CH_2=CH)(CH_3)_2SiO_{1/2}$ unit to $SiO_2$ unit was 0.9.

The above methylhydrogenpolysiloxane was represented by the following average formula [V].

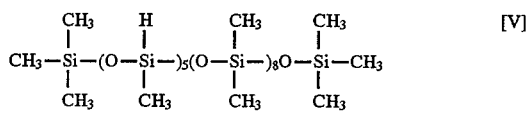

The above silica microballoons were made of synthetic quartz having an average particle size of 90 μm and a true specific gravity of 0.25.

The above quartz glass fibers were made of synthetic quartz having an average diameter of 15 μm and an average axial length of about 3 mm.

The carbon fibers had an average diameter of 7 μm and an average length of about 3 mm.

An ablating material was prepared by curing the ablator composition in the following manner.

First, the uniformly mixed ablator composition was poured into a mold. Then, this ablator composition was allowed to stand for at least 24 hr at room temperature for preliminarily curing the same. Then, this cured ablator composition was heated at a temperature of 100° C. for 1 hr in a furnace to more increase the crosslinking density, thereby to prepare the ablating material.

Density of the ablating material is shown in Table 1. Ten test pieces (TP1 to TP10) were prepared from the above ablating material. As is shown in Table 2, each test piece was exposed to a high temperature gas ($N_2+O_2$) with a certain specific heating rate in an arc heating wind tunnel. Then, the surface recess rate of the ablating material was determined. The result is shown in Table 2 and FIGURE.

EXAMPLES 2–7

In Examples 2–7, ablator compositions were prepared, as shown in Table 1, by modifying proportion of the components of the ablator composition of Example 1. Then, ablating materials were prepared by curing the ablator compositions in the same manner as that of Example 1. Densities of the ablating materials are shown in Table 1. One test piece, TP11, TP13, TP15, TP17, TP19 or TP21, was respectively prepared from the ablating material of each of Examples 2–7. Each test piece was subjected to the same evaluation test of Example 1. Then, the surface recess rate of each ablating material was determined. The results are shown in Table 2 and FIGURE.

According to the evaluation test of Examples 1–7, the heating rates were within the range of from 2.15 to 7.15 MW/m$^2$ and the surface recess rates were within the range of from 0.051 to 0.529 mm/s (see Table 2 and FIGURE). Even under a condition of a high heating rate such as about 4 MW/m$^2$, the ablating materials according to the present invention showed surface recess rates of less than 0.4 mm/s. In contrast, under such condition, conventional ablating materials show surface recess rates of about 3 mm/s. All the ablating materials according to the present invention showed low surface recess rates of less than 0.6 mm/s throughout the heating rate range of from 2.15 to 7.15 MW/m$^2$. It is considered that this good result was obtained by the addition of the silicone resin of a higher amount, the catalyst, the silica microballoons, and the quartz glass fibers and/or the carbon fibers. It should be noted that test pieces, TP11 and TP13, having relatively high densities (0.7 and 1.0 g/cc) showed very low surface recess rates under a condition of high heating rates.

COMPARATIVE EXAMPLE

In Comparative Example, an ablator composition was prepared, as shown in Table 1, by modifying proportion of the components of the ablator composition of Example 1.

In Comparative Example, the amounts of the silica microballoons and the quartz glass fibers and the density of ablating material were not in accordance with the present invention.

An ablating material was prepared by curing the ablator composition in the same manner as that of Example 1.

Density of the ablating material is shown in Table 1. One test piece, TP23, was prepared from the ablating material of Comparative Example. The test piece was subjected to the same evaluation test of Example 1. Then, the surface recess rate of the test piece was determined. The result is shown in Table 2 and FIGURE. It is understood that the test piece (TP23) showed a very high surface recess rate as compared with Examples 1–7.

TABLE 1

| | Ablator Compositions | | | | | | | |
|---|---|---|---|---|---|---|---|---|
| | Ex. 1 | Ex. 2 | Ex. 3 | Ex. 4 | Ex. 5 | Ex. 6 | Ex. 7 | Comp. Ex. |
| Composition | | | | | | | | |
| Diorganopolysiloxane (parts by weight) | 70 | 70 | 70 | 70 | 70 | 70 | 70 | 70 |
| Silicone resin (parts by weight) | 30 | 30 | 30 | 30 | 30 | 30 | 30 | 30 |
| Organohydragenpolysiloxane (parts by weight) | 11.6 | 11.4 | 11.4 | 11.6 | 11.6 | 11.6 | 11.1 | 11.6 |
| Catalyst (ppm)* | 30 | 120 | 35 | 50 | 50 | 50 | 50 | 50 |
| Silica microballoons (parts by weight) | 43 | 17 | 2.6 | 43 | 43 | 43 | 41 | 170 |
| Quartz glass fibers (parts by weight) | 7.9 | 6.6 | 5.8 | 11.1 | 0 | 7.9 | 7.6 | 20 |
| Carbon fibers (parts by weight) | 4.7 | 3.9 | 3.5 | 4.7 | 4.7 | 0 | 4.6 | 8.6 |
| Density (g/cc) | 0.5 | 0.7 | 1.0 | 0.5 | 0.5 | 0.5 | 0.5 | 0.3 |

*The amount of catalyst is expressed by ppm by weight of the platinum atom therein based on the total weight of the diorganopolysiloxane (phenylmethylpolysiloxane) and the silicone resin.

TABLE 2

| | Test piece No. | Heating rate (MW/m$^2$) | Surface recess rate (mm/s) |
|---|---|---|---|
| Ex. 1 | TP1 | 5.70 | 0.370 |
| " | TP2 | 3.60 | 0.164 |
| " | TP3 | 3.10 | 0.140 |
| " | TP4 | 2.40 | 0.082 |
| " | TP5 | 2.15 | 0.123 |
| " | TP6 | 3.95 | 0.191 |
| " | TP7 | 4.75 | 0.175 |
| " | TP8 | 5.00 | 0.401 |
| " | TP9 | 6.25 | 0.529 |
| " | TP10 | 3.75 | 0.293 |
| Ex. 2 | TP11 | 4.70 | 0.131 |
| Ex. 3 | TP13 | 3.10 | 0.051 |
| Ex. 4 | TP15 | 4.18 | 0.201 |
| Ex. 5 | TP17 | 7.15 | 0.400 |
| Ex. 6 | TP19 | 5.90 | 0.388 |
| Ex. 7 | TP21 | 5.85 | 0.300 |
| Comp. Ex. | TP23 | 3.75 | 1.032 |

What is claimed is:

1. An ablator composition for providing ablation protection, comprising:
   A. 100 parts by weight of a mixture of vinyl-containing organopolysiloxanes, said mixture containing 50–80 wt. % of a diorganopolysiloxane which contains vinyl groups and 20–50 wt. % of a silicone resin which contains vinyl groups, said amounts of said diorganopolysiloxane and said silicone resin being based on the total weight of said mixture, the silicone resin being soluble in toluene and consisting essentially of R$_3$SiO$_{1/2}$ unit and SiO$_{/2}$ unit wherein R represents the same or different monovalent hydrocarbons, each of which is unsubstituted or substituted and has 1 to 10 carbon atoms, the molar ratio of R$_3$SiO$_{1/2}$ unit to SiO$_2$ unit being in a range of from 0.6 to 1.4;
   B. an organohydrogenpolysiloxane containing in one molecule thereof at least three hydrogen atoms which are directly bonded to silicone atoms thereof, the amount of said organohydrogenpolysiloxane being such that the molar ratio of the total of said hydrogen atoms to the total of said vinyl groups contained in said mixture is in a range of from 0.5 to 5.0;
   C. a catalyst which is at least one selected from the group consisting of metallic platinum and platinum compounds, the amount of said catalyst being sufficient to cure the ablator composition;
   D. silica microballoons, the amount of the silica microballoons being 2.6 to 150 parts by weight; and
   E. at least one component selected from the group consisting of 5 to 15 parts by weight of quartz glass fibers and 3 to 15 parts by weight of carbon fibers,
   wherein an ablating material prepared by curing the ablator composition has a density of at least 0.35 g/cc.

2. An ablator composition according to claim 1, wherein said ablating material has a density ranging from 0.35 to 0.80 g/cc.

3. An ablator composition according to claim 1, wherein the amount of said silica microballoons is from 15 to 150 parts by weight.

4. An ablator composition according to claim 1, wherein a vinyl group equivalent of said silicone resin is in a range of from 0.05 to 0.15 mol/100 g resin.

5. An ablator composition according to claim 1, wherein the amount of platinum atom of said catalyst is from 1 to 2000 ppm by weight based on the total weight of said diorganopolysiloxane and said silicone resin.

6. An ablator composition according to claim 5, wherein the amount of said platinum atom of said catalyst is from 10 to 200 ppm based on the total weight of said diorganopolysiloxane and said silicone resin.

7. An ablating material which is prepared by curing an ablator composition according to claim 1.

8. An ablator composition for providing ablation protection, comprising:
   A. 100 parts by weight of a mixture of vinyl-containing organopolysiloxanes, said mixture containing 50–80 wt. % of a diorganopolysiloxane which contains vinyl groups and 20–50 wt. % of a silicone resin which contains vinyl groups, said amounts of said diorganopolysiloxane and said silicone resin being based on the total weight of said mixture, the silicone resin being soluble in toluene and consisting essentially of $R_3SiO_{1/2}$ unit and $SiO_2$ unit wherein R represents the same or different monovalent hydrocarbons, each of which is unsubstituted or substituted and has 1 to 10 carbon atoms, the molar ratio of $R_3SiO_{1/2}$ unit to $SiO_2$ unit being in a range of from 0.6 to 1.4;

B. an organohydrogenpolysiloxane containing in one molecule thereof at least three hydrogen atoms which are directly bonded to silicone atoms thereof, the amount of said organohydrogenpolysiloxane being such that the molar ratio of the total of said hydrogen atoms to the total of said vinyl groups contained in said mixture is in a range of from 0.5 to 5.0;

C. a catalyst which is at least one selected from the group consisting of metallic platinum and platinum compounds, the amount of said catalyst being sufficient to cure the ablator composition;

D. 15–150 parts by weight of silica microballoons; and

E. 5–15 parts by weight of quartz glass fibers, wherein an ablating material prepared by curing the ablator composition has a density of at least 0.35 g/cc.

9. An ablator composition according to claim 8, further comprising up to 15 parts by weight of carbon fibers.

10. An ablator composition according to claim 8, wherein the ablating material prepared by curing the ablator composition has a density ranging from 0.35 to 0.80 g/cc.

11. The ablator composition of claim 1, wherein the monovalent hydrocarbon groups on the diorganopolysiloxane of Component A, are present as phenyl groups, in a mol percent of 1 to 20 and as methyl groups in a mol percent of 80 to 99.

12. The ablator composition of claim 11, wherein the mol percent of phenyl groups present as monovalent hydrocarbon groups on the diorganopolysiloxane is in the range of 5 to 10 and the mol percent of methyl groups is in the range of 90 to 95.

* * * * *

UNITED STATES PATENT AND TRADEMARK OFFICE
CERTIFICATE OF CORRECTION

PATENT NO. : 5,661,198
DATED : August 26, 1997
INVENTOR(S) : Yoshifumi INATANI et al.

It is certified that error appears in the above-identified patent and that said Letters Patent is hereby corrected as shown below:

On the title page, item [75] should read as follows:

--[75] Inventors: Yoshifumi Inatani, No. 1748-15, Hanbara, Aikawa-cho, Aiko-gun, Kanagawa Prefecture; Kazunori Kawasaki, Kawagoe City; Tadashi Harada, Omiya; Hironao Fujiki, Iwahana-machi; Mikio Shiono, Annaka, all of Japan--

Signed and Sealed this

Twenty-fifth Day of November, 1997

Attest:

BRUCE LEHMAN

Attesting Officer

Commissioner of Patents and Trademarks